US009972955B1

(12) United States Patent
Carlucci (10) Patent No.: US 9,972,955 B1
(45) Date of Patent: May 15, 2018

(54) TRAVEL VOLTAGE CONVERTER AND ADAPTER (71) Applicant: Conair Corporation, Stamford, CT (US)

(72) Inventor: Vito Carlucci, Stratford, CT (US)

(73) Assignee: CONAIR CORPORATION, Stamford, CT (US)

(*) Notice: Subject to any disclaimer, the term of this patent is extended or adjusted under 35 U.S.C. 154(b) by 0 days. days.

(21) Appl. No.: 15/353,456

(22) Filed: Nov. 16, 2016

(51) Int. Cl.
*H01R 31/06* (2006.01)
*H02M 5/293* (2006.01)
*H01R 13/70* (2006.01)
*H01R 13/66* (2006.01)

(52) U.S. Cl.
CPC ....... *H01R 31/065* (2013.01); *H01R 13/6683* (2013.01); *H01R 13/70* (2013.01); *H02M 5/293* (2013.01)

(58) Field of Classification Search
CPC .............. H01R 13/065; H01R 13/6675; H01R 13/6683; H01R 13/70; G05F 1/14; G05F 1/42; G05F 1/52; G05F 1/56; G05F 1/63; G05F 1/455; G05F 1/575; G05F 1/607; G05F 1/648; Y02B 70/1466; H02M 3/07; H02M 3/156–3/158; H02M 1/10; H02M 1/32; H03F 1/34; H03F 1/42; H03F 1/45; H02J 9/061; G06F 1/263
USPC .... 363/37, 65, 142, 146; 323/268, 269, 273, 323/280, 281, 290–305
See application file for complete search history.

(56) References Cited

U.S. PATENT DOCUMENTS

| | | | |
|---|---|---|---|
| 3,590,362 A | 6/1971 | Kakalec | |
| 3,833,821 A | 9/1974 | Weaver | |
| 4,543,624 A * | 9/1985 | Rumble | H01R 13/6675 363/141 |
| 5,159,545 A * | 10/1992 | Lee | H01R 31/065 363/146 |
| 5,589,760 A | 12/1996 | Lee | |
| 6,185,082 B1 * | 2/2001 | Yang | H02M 1/32 323/285 |
| 8,009,451 B2 * | 8/2011 | So | H01R 13/7039 307/72 |
| 8,175,533 B2 * | 5/2012 | Schubert | H01R 13/66 455/66.1 |
| 8,212,491 B2 | 7/2012 | Kost et al. | |

(Continued)

*Primary Examiner* — Yemane Mehari
(74) *Attorney, Agent, or Firm* — Lawrence Cruz, Esq.; Joseph W. Schmidt, P.C.

(57) ABSTRACT

A portable power converter includes a housing having a front surface and a rear surface, a socket disposed on the front surface and configured to conduct an input waveform, and a plug disposed on the rear surface and configured to conduct an output waveform. The power converter also includes a power conversion circuit disposed within the housing and coupled to the socket and the plug. The power conversion circuit includes a low power conversion circuit coupled to the socket and configured to transform the input waveform into a first waveform, a high power conversion circuit coupled to the socket and configured to transform the input waveform into a second waveform, and a switch circuit coupled to the low power conversion circuit and the high power conversion circuit. The switch circuit is configured to combine the first waveform and the second waveform to generate the output waveform.

14 Claims, 5 Drawing Sheets (56) References Cited

U.S. PATENT DOCUMENTS

2004/0085793 A1* 5/2004 Afzal ..................... G06F 1/263
                                                    363/142

* cited by examiner

TRAVEL VOLTAGE CONVERTER AND ADAPTER

BACKGROUND

1. Technical Field

The present disclosure relates to a travel voltage converter for use with medium power, electronics-controlled appliances and high power conventional appliances.

2. Background of the Related Art

Various portable power converters are commonly known in the art, which convert conventional 230/240 Volt AC (VAC) at 50/60 Hz into 110/120 VAC at 50/60 Hz. However, converters that are designed to handle high power draw appliances, such as hair dryers, are too large and too expensive. In addition, these converters are incapable of operating with medium power draw appliances that have electronic components.

SUMMARY

The present disclosure relates to further improvements in portable voltages converters. A power converter includes a power conversion board having a low power conversion circuit, such as a transformer, and a high power conversion circuit, such as a triode for an alternating current ("TRIAC") circuit. The power conversion board includes a switching circuit that is configured to combine the output of the low and high power conversion circuits to provide an output waveform suitable to power high power draw appliances as well as medium power draw appliances that include electronic components.

In accordance with one embodiment, a power converter is disclosed. The power converter includes a housing having a front surface and a rear surface, a socket disposed on the front surface and configured to conduct an input waveform and a plug disposed on the rear surface and configured to conduct an output waveform. The power converter also includes a power conversion circuit disposed within the housing and coupled to the socket and the plug. The power conversion circuit includes a low power conversion circuit coupled to the socket and configured to transform the input waveform into a first waveform, a high power conversion circuit coupled to the socket and configured to transform the input waveform into a second waveform, and a switch circuit coupled to the low power conversion circuit and the high power conversion circuit. The switch circuit is configured to combine the first waveform and the second waveform to generate the output waveform.

According to one aspect of the present disclosure, the power conversion circuit further includes a sensor coupled to the switch circuit. The sensor is configured to detect an increase in temperature due to excessive power draw and to disconnect the low power conversion circuit in response to the increase in temperature.

According to another aspect of the present disclosure, the power converter further includes a switch disposed on the housing and configured to move between a plurality of positions. The switch is coupled to the switching circuit and is configured to set the switching circuit into one of a plurality of operating modes. The switch may be configured to move between a first position, a second position, and a third position. The switch circuit may be configured to operate in a first mode in which the switch circuit is coupled to the low power conversion circuit and is disconnected from the high power conversion circuit. The switch circuit may be also configured to operate in a second mode in which the switch circuit is coupled to the high power conversion circuit and is disconnected from the low power conversion circuit.

According to a further aspect of the present disclosure, the power conversion circuit may further include a high power resistor coupled in series relative to the low power conversion circuit and the switching circuit. The switch circuit may be configured to operate in a third mode in which the switch circuit is coupled to the high power conversion circuit and the low power conversion circuit through the high power resistor.

According to one aspect of the present disclosure, the power conversion circuit may further include a thermistor disposed adjacent the high power resistor, and configured to measure a temperature of the high power resistor. The thermistor may be coupled to the switching circuit and the switching circuit may be configured to disconnect the low power conversion circuit based on the temperature of the high power resistor.

According to another aspect of the present disclosure, the low power conversion circuit is a transformer and the high power conversion circuit is a triode for alternating current circuit.

Other advantages of the present disclosure will be appreciated by the following description.

BRIEF DESCRIPTION OF THE DRAWINGS

Various embodiments of the present disclosure are described hereinbelow with references to the drawings, wherein.

DETAILED DESCRIPTION OF THE EMBODIMENT(S)

Figure 1:
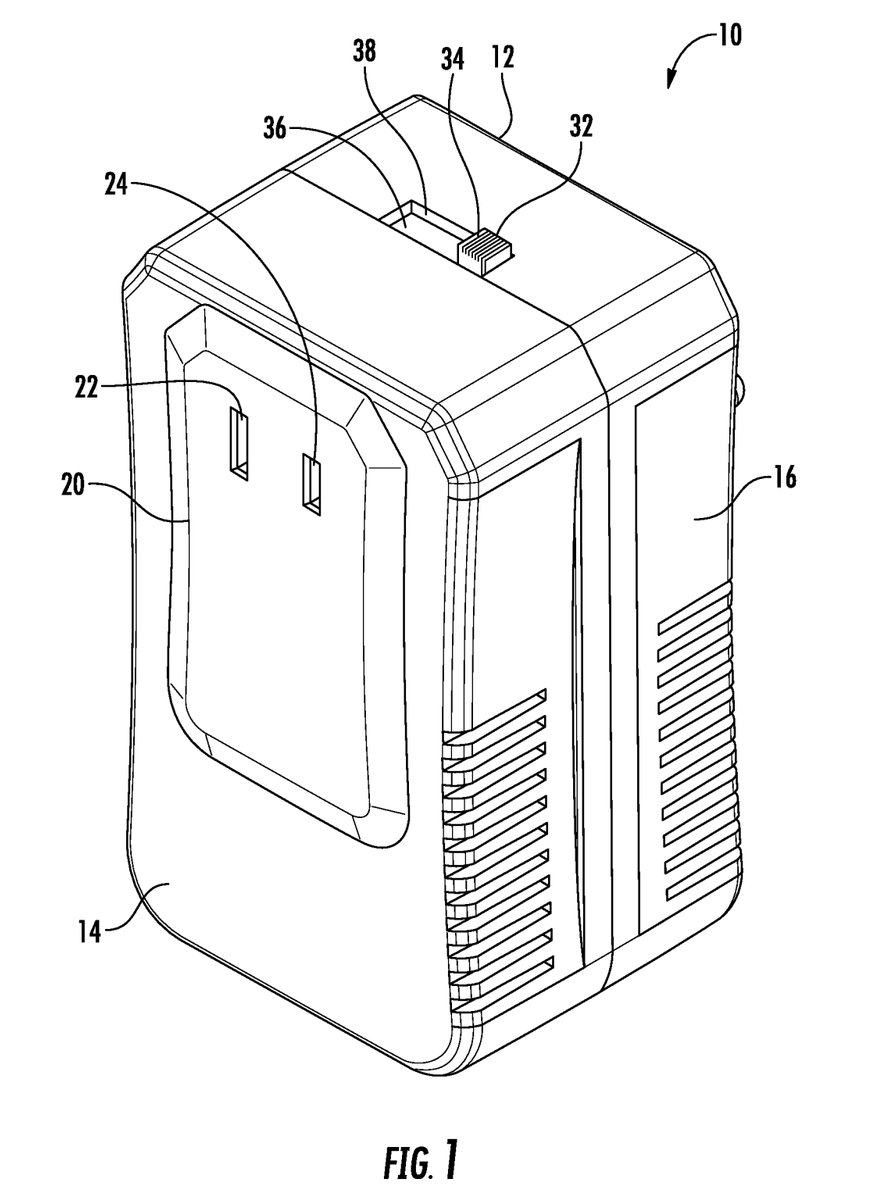
FIG. 1 is a front perspective view of a power converter in accordance with the principles of the present disclosure.

Referring now to the drawings wherein like reference numerals identify similar components throughout the several views, FIG. 1 illustrates a power converter 10 in accordance with the principles of the present disclosure. In this embodiment, the power converter 10 is a portable power converter configured to convert line voltage 230/240 Volt AC (VAC) at 50/60 Hz to 110/120 VAC at 50/60 Hz.

Figure 2:
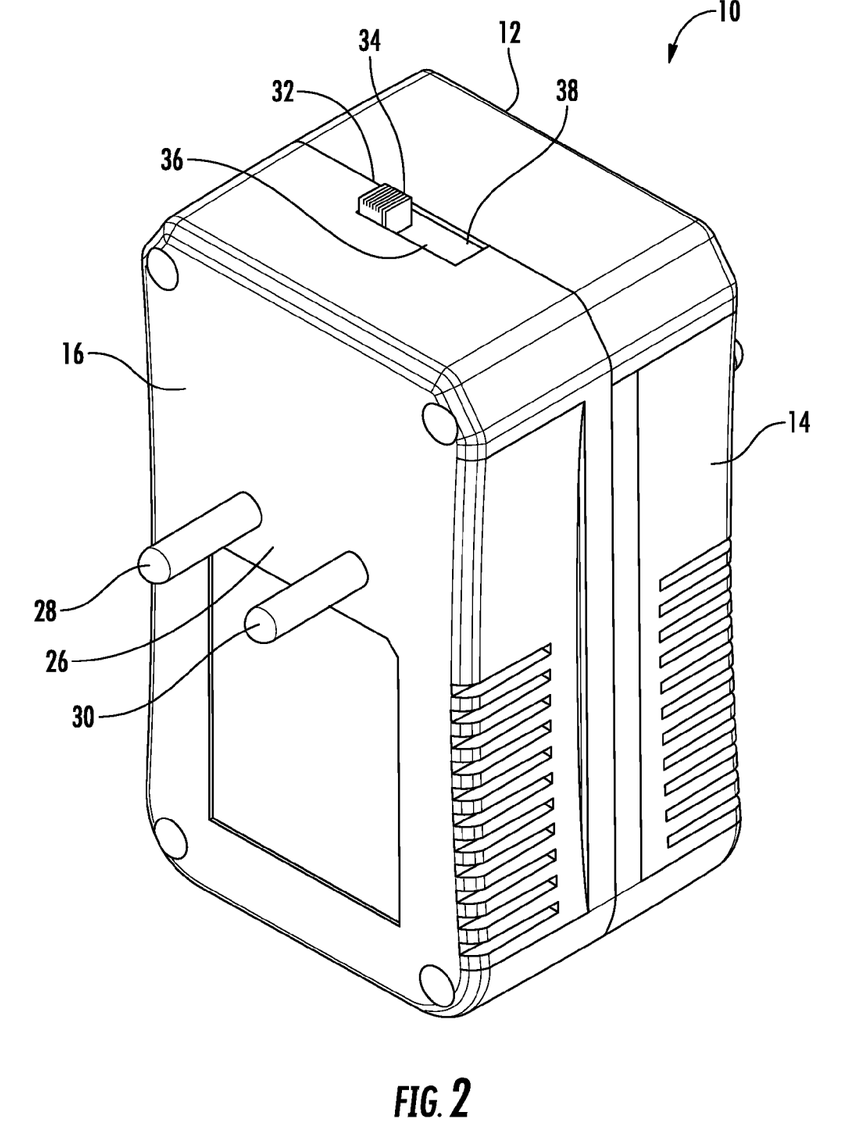
FIG. 2 is a back perspective view of the power converter of FIG. 1.
Figure 3:
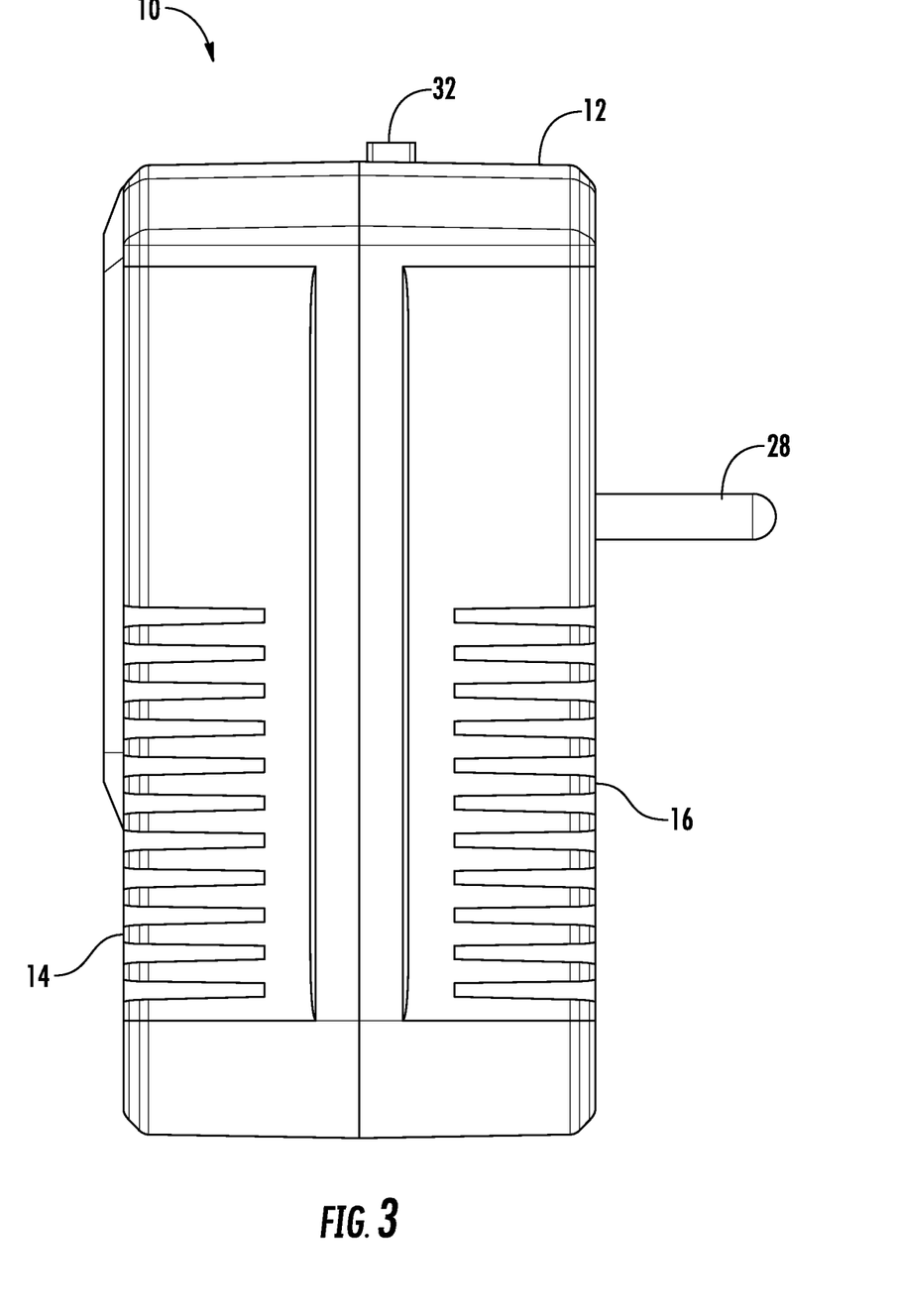
FIG. 3 is a side view of the power converter of FIG. 1.

With reference to FIGS. 1-3, the power converter 10 includes a housing 12 having a front portion 14 and a rear portion 16. The power converter includes an outlet 20 disposed on the front portion 14. The outlet 20 includes a pair of female contacts 22, 24. As best depicted in FIGS. 2 and 3, the housing 12 also includes a male plug 26 disposed on the rear portion 16. The male plug 26 includes a pair of pins 28, 30. The outlet 20 is shown as a National Electrical Manufacturers Association ("NEMA") connector in use in North, Central, and South Americas and in Japan. It is envisioned that the outlet 20 may be of any suitable type, such as those approved by International Commission on the Rules for the Approval of Electrical Equipment ("IECEE")

or any other suitable standard. Similarly, although the male plug 26 is shown as an IECEE plug, it is envisioned the male plug 26 may be any suitable plug. In embodiment, the pins 28, 30 may be removable, allowing for attachment of pins that correspond to a desired plug standard.

Figure 4:
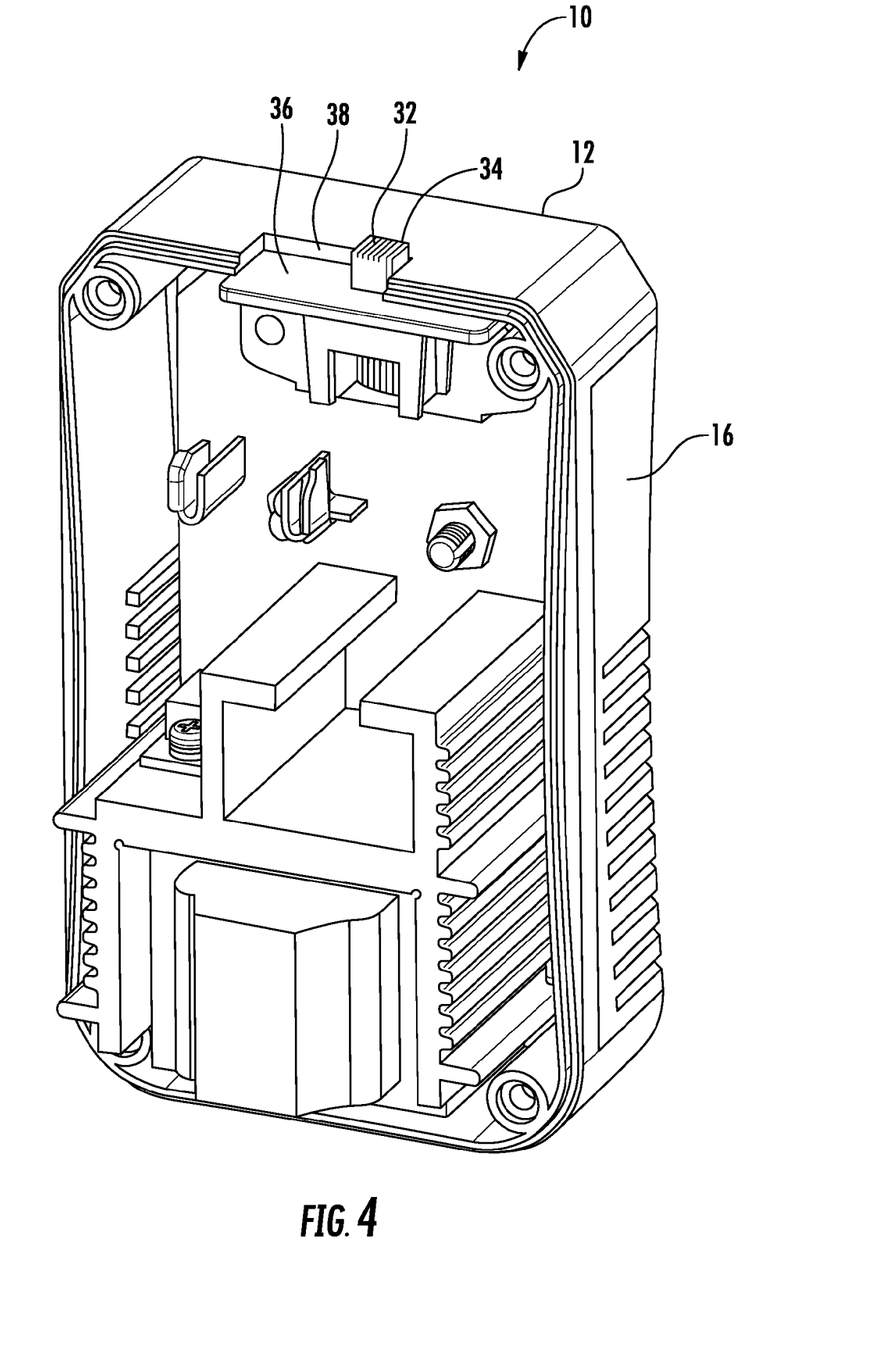
FIG. 4 is a partially disassembled view of the power converter of FIG. 1.

With reference to FIGS. 3 and 4, the power converter 10 also includes a switch 32 disposed between the front portion 14 and the rear portion 16. In an embodiment, the switch 32 may be disposed on any part of the housing 12. As shown in FIG. 4, in which the rear portion 16 of the housing 12 is separated from the front portion 14, the switch 32 includes a protuberance 34 disposed on a plate 36. The switch 32 is disposed in a cutout 38, allowing the switch 32 to slide within the housing 12 along a plane defined by the plate 36. The switch 32 is configured to switch between a plurality of operating modes of the power converter 10 as described in further detail below.

Figure 5:
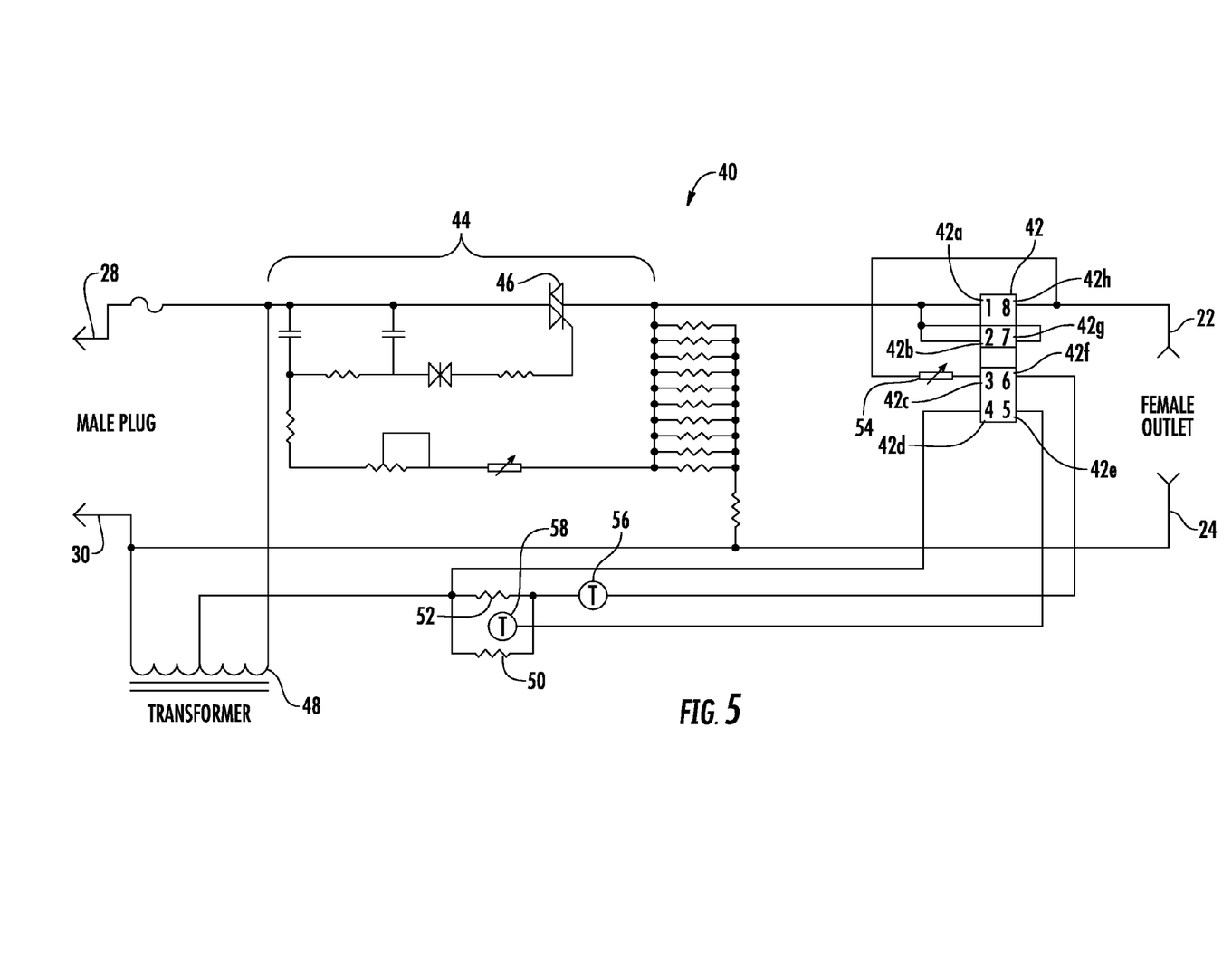
FIG. 5 is an electrical schematic of power conversion circuit disposed within the power converter of FIG. 1.

With reference to FIG. 5, a power conversion circuit 40 of the power converter 10 is shown. The power conversion circuit 40 may be a printed circuit board ("PCB") with the components described below coupled to each other using a plurality of conductive traces. The power conversion circuit 40 includes a switching circuit (e.g., integrated circuit) 42, which controls the output of the power conversion circuit 40. The switch 32 is coupled to the switching circuit 42, such that the switch 32 selects the operating mode of the switching circuit 42. The power conversion circuit 40 receives the power from the pins 28, 30 and outputs the converted power to the female contacts 22, 24.

The power conversion circuit 40 is configured to convert 230/240 VAC at 50/60 Hz to 110/120 VAC at 50/60 Hz. It is envisioned that the power conversion circuit 40 may be configured to convert any type of alternating current waveform into any desirable output current waveform and the above-noted values are exemplary.

The power conversion circuit 40 includes a triode for an alternating current ("TRIAC") circuit 44 that is configured to convert current under high power loads, such as those above about 400 watts (W). Those skilled in the art will appreciate that the 400 W threshold is used for illustrative purposes only and that the TRIAC circuit 44 may be tuned to operate at any suitable load. The TRIAC circuit 44 includes a TRIAC 46 and reduces root mean square of a portion of the input waveform (e.g., 230/240 VAC at 50/60 Hz) to generate the output waveform (e.g., 110/120 VAC at 50/60 Hz). The TRIAC circuit 44 operates by delaying the firing of the TRIAC 46 after the voltage of the input waveform crosses the 0 volt point. Due to the operation of the TRIAC circuit 44, namely, chopping of the input waveform to reduce the voltage, the resulting output waveform has an irregular, e.g., non-sinusoidal shape. Accordingly, the resulting output waveform is suitable for devices that have a high power draw, such as hair dryers.

The power conversion circuit 40 also includes a transformer 48 configured to convert current under low power loads, such as those below 25 W. Due to low power draw, only a portion of electric devices fall within this range, such as AC/DC chargers for electronic devices. The transformer 48 outputs a sinusoidal waveform, thus, maintaining the shape of the input waveform.

Certain types of consumer devices that include electronic components for controlling their operation, such as mutable temperature controls and auto shut off features, have midlevel power requirements. Suitable examples of such devices include straightening and/or curling irons and/or brushes. Such devices have power draws from about 25 W to about 400 W. The majority of these devices would not operate when provided converted power solely through the TRIAC circuit 44, which outputs an irregularly shaped waveform and as a result, these devices may be permanently damaged. In addition, the transformer 48 would not be capable of converting power at higher power draws, such as those above 25 W. Thus, the power conversion circuit 40 according to the present disclosure utilizes the TRIAC circuit 44 in combination with the transformer 48 to convert power for use with devices having a power draw from about 25 W to about 400 W. The power conversion circuit 40 is operable in three modes, a low power mode in which the transformer 48 is utilized to convert power, a high power mode, in which the TRIAC circuit 44 is used to convert power, and a third, hybrid mode, in which the TRIAC circuit 44 and the transformer 48 are both used to convert power.

The switch 32 is slidable along the cutout 38 among a plurality of positions and is used to select the desired power conversion mode for the power converter 10 from one of the three modes. Each of the positions corresponds to one of the modes. The switching circuit 42 includes a plurality of ports 42*a-h*, which are used to enable or disable various inputs and outputs of the power conversion circuit 40 based on the selected mode. The female contact 22 is coupled to the port 42*h* of the switching circuit 42, while the female contact 24 is directly coupled to the pin 30. Thus, the power conversion circuit 40 modifies the output supplied to the female contacts 22, 24 through the TRIAC circuit 44 and the transformer 48.

During operation, when the switch 32 is moved into a first position, the switch 32 signals the switching circuit 42 to a select one of the modes, such as the low power mode. Thus, when the switch 32 is set to the low power mode the switching circuit 42 activates or otherwise enables the port 42*d*, which is coupled to the transformer 48, allowing for the low power waveform from the transformer 48 to be directly supplied to the switching circuit 42 and to the female contacts 22, 24.

When the switch 32 is moved to a second position, the switch 32 signals the switching circuit 42 to select the high power mode. In this mode, the switching circuit 42 activates one or more of the ports 42*a*, 42*b*, or 42*g*, which are coupled to the TRIAC circuit 44. This configuration allows for the TRIAC circuit 44 to supply high power current to the female contacts 22, 24.

Once the switch 32 is moved to a third position, the switch 32 signals the switching circuit 42 to select the hybrid power mode. In this mode, the switching circuit 42 enables the port 42*f*, which is connected to a pair of high power resistors 50, 52 coupled in parallel with respect to each other forming a current divider. The high power resistors 50, 52 are in turn, coupled to the transformer 48. In addition, in the hybrid mode, the switching circuit 42 activates one or more of the ports 42*a*, 42*b*, or 42*g*, which are coupled to the TRIAC circuit 44. This configuration allows for the TRIAC circuit 44 to also supply high power current to the switching circuit 42. The high power resistors 50 and 52 limit the maximum energy of transformer 48 when connected to a higher power load, e.g., above 25 W.

The switching circuit 42 is also coupled to a negative temperature coefficient ("NTC") thermistor 54 through the port 42*c*, which is also coupled to the female contact 22. The NTC thermistor 54 prevents overload of the transformer 48 in the event a high power load, e.g., a hair dryer, is coupled to the power converter 10. The NTC thermistor 54 may also be selected such that it limits the current at a desired set point, which corresponds to the operational limit of the transformer 48.

Thus, in the hybrid mode, the output of the transformer 48 is coupled through the high power resistors 50, 52 and the NTC thermistor 54 to the output of the TRIAC circuit 44. The configuration allows for the perfect sine waveform generated by the transformer 48 to be combined with the irregular waveform generated by the TRIAC circuit 44. The combination of the perfect sine wave and the irregular wave allows for the sensitive electronic circuitry of the device coupled to the power converter 10 to function normally while the high power draw devices also have available energy to heat up quickly and normally.

In an embodiment, the power conversion circuit 40 may also include a thermostat 56 disposed adjacent to (from about 0.1 millimeter to about 1 centimeter) the high power resistors 50 and 52, e.g., on a printed circuit board. The thermostat 56 may be coupled in series with the high power resistors 50, 52. The thermostat 56 may be used to prevent damage to the power conversion circuit 40 when operating in the hybrid mode and a higher power load (e.g., a hair dryer) is coupled to the power converter 10. Thus, when the thermostat 56 reaches a predetermined temperature set point due to overheating, the thermostat 56 may then disconnect the transformer 48 from the switching circuit 42, allowing the power conversion circuit 40 to operate using only the TRIAC circuit 44.

In further embodiments, a thermostat 58 may be disposed adjacent the high power resistors 50, 52 but without electrically contacting them. The thermostat 56 may be coupled to the switching circuit 42 at the port 42e. The switching circuit 42 is configured to deactivate or disable the port 42f, thus disconnecting the transformer 48 from the switching circuit 42, allowing the power conversion circuit 40 to operate using only the TRIAC circuit 44.

Although the illustrative embodiments of the present disclosure have been described herein with reference to the accompanying drawings, the above description, disclosure, and figures should not be construed as limiting, but merely as exemplifications of particular embodiments. It is to be understood, therefore, that the disclosure is not limited to those precise embodiments, and that various other changes and modifications may be effected therein by one skilled in the art without departing from the scope or spirit of the disclosure.

What is claimed is:

1. A power converter comprising:
   a housing;
   an input disposed on the housing and configured to conduct an input waveform;
   an output disposed on the housing and configured to conduct an output waveform;
   a power conversion circuit disposed within the housing and coupled to the input and the output, power conversion circuit including:
     a low power conversion circuit coupled to the input and configured to transform the input waveform into a first waveform;
     a high power conversion circuit couple to the input and configured to transform the input waveform into a second waveform; and
     a switch circuit couplable to the low power conversion circuit and the high power conversion circuit; and,
   a switch mounted to the housing and configured to move between a first position, a second position, and a third position corresponding to first, second and third modes of operation of the switch circuit to control the output waveform, wherein:
     when in the first mode of operation, the switch circuit is coupled to the low power conversion circuit and is disconnected from the high power conversion circuit to deliver the first waveform to the outlet;
     when in the second mode of operation the switch circuit is coupled to the high power conversion circuit and is disconnected from the low power conversion circuit to deliver the second waveform to the outlet; and
     when in the third mode of operation the switch circuit is coupled to the high power conversion circuit and the low power conversion circuit to combine the first waveform and the second waveform for delivery to the outlet.

2. A power converter, comprising:
   a housing including an input configured to conduct an input waveform and an output configured to conduct an output waveform;
   a power conversion circuit disposed within the housing and coupled to the input and the output, the power conversion circuit including:
     a low power conversion circuit coupled to the input and configured to transform the input waveform into a first waveform;
     a high power conversion circuit coupled to the input and configured to transform the input waveform into a second waveform; and
     a switch circuit coupled to the low power conversion circuit and the high power conversion circuit, the switch circuit actuable to combine the first waveform and the second waveform; and
     a sensor coupled to the switch circuit, the sensor configured to detect an increase in temperature due to excessive power draw and to disconnect the low power conversion circuit in response to the increase in temperature.

3. The power convertor according to claim 2, further comprising:
   a switch disposed on the housing and configured to move between a plurality of positions.

4. The power converter according to claim 3, wherein the switch is coupled to the switch circuit, the switch being configured to set the switch circuit into one of a plurality of operating modes.

5. The power converter according to claim 4, wherein the switch is configured to move between a first position, a second position, and a third position.

6. The power converter according to claim 5, wherein the switch circuit is configured to operate in a first mode in which the switch circuit is coupled to the low power conversion circuit and is disconnected from the high power conversion circuit.

7. The power converter according to claim 6, wherein the switch circuit is configured to operate in a second mode in which the switch circuit is coupled to the high power conversion circuit and is disconnected from the low power conversion circuit.

8. The power converter according to claim 7, wherein the power conversion circuit further includes a high power resistor coupled in series relative to the low power conversion circuit and the switch circuit.

9. The power converter according to claim 8, wherein the switch circuit is configured to operate in a third mode in which the switch circuit is coupled to the high power conversion circuit and the low power conversion circuit through the high power resistor.

10. The power converter according to claim 9, wherein the power conversion circuit further includes a thermistor disposed adjacent the high power resistor, the thermistor configured to measure a temperature of the high power resistor.

11. The power converter according to claim 10, wherein the thermistor is coupled to the switching circuit and the switching circuit is configured to disconnect the low power conversion based on the temperature of the high power resistor.

12. The power converter according to claim 1, wherein the low power conversion circuit is a transformer.

13. The power converter according to claim 1, wherein the high power conversion circuit is a triode for alternating current circuit.

14. The power converter according to claim 1, wherein the power conversion circuit further includes a high power resistor coupled in series relative to the low power conversion circuit and the switch circuit, the switch circuit coupled to the high power conversion circuit and the low power conversion circuit through the high power resistor when in the third mode of operation.

\* \* \* \* \*